US007660848B2

(12) United States Patent
Torii

(10) Patent No.: US 7,660,848 B2
(45) Date of Patent: Feb. 9, 2010

(54) INFORMATION TERMINAL, AND SERVER FOR EFFICIENTLY EXCHANGING MESSAGES VIA A NETWORK

(75) Inventor: Masahiro Torii, Tokyo (JP)

(73) Assignee: Sony Corporation, Tokyo (JP)

( * ) Notice: Subject to any disclaimer, the term of this patent is extended or adjusted under 35 U.S.C. 154(b) by 960 days.

(21) Appl. No.: 10/903,078

(22) Filed: Aug. 2, 2004

(65) Prior Publication Data

US 2005/0060379 A1 Mar. 17, 2005

(30) Foreign Application Priority Data

Aug. 6, 2003 (JP) ............................ 2003-287825

(51) Int. Cl.
*G06F 15/16* (2006.01)

(52) U.S. Cl. ........................................ 709/203; 463/42

(58) Field of Classification Search ..................... 707/3; 463/42; 709/204, 217, 206
See application file for complete search history.

(56) References Cited

U.S. PATENT DOCUMENTS

2002/0160838 A1* 10/2002 Kim ............................ 463/42
2005/0021666 A1* 1/2005 Dinnage et al. ............. 709/217
2005/0086211 A1* 4/2005 Mayer ........................... 707/3
2005/0239550 A1* 10/2005 Hardisty et al. ............... 463/42
2006/0178216 A1* 8/2006 Shea et al. ..................... 463/42
2008/0171601 A1* 7/2008 Kirmse et al. ................. 463/42

FOREIGN PATENT DOCUMENTS

JP 2003-85398 3/2003
JP 2003-216835 7/2003

* cited by examiner

*Primary Examiner*—Dustin Nguyen
(74) *Attorney, Agent, or Firm*—Oblon, Spivak, McClelland, Maier & Neustadt, L.L.P.

(57) ABSTRACT

An instant messaging communication system including information terminals and an instant messaging server is provided. The information terminals are configurable for use by searching users or search target users. The information terminal of a searching user acquires, from the instant messaging server, search target user information, and searches the search target user information for a search target user matching a profile created by the searching user. The information terminal of a search target user registers the search target user profile with the instant messenger server. The instant messenger server is a conduit among the searching users and the search target users, automatically sending updated information to the searching users upon registering a new search target user or updating the information of a search target user. Because the terminals perform the search and the server acts as a conduit, reliability and efficiency of the instant messenger network is improved.

9 Claims, 10 Drawing Sheets

30

| ID (31) | END POINT INFORMATION (32) | PSID LIST (33) | PRESENCE INFORMATION (34) | NICKNAME (35) |
|---|---|---|---|---|
| 1 | | | | |
| 2 | | | | |
| ⋮ | | | | |

FIG. 4

50

PD OF EXHIBITOR
(SEARCH TARGET PERSON)

| ITEM | VALUE |
|---|---|
| ARTICLE | 1 (= WATCH) |
| BRAND NAME | 1 (= SEIKO) |
| YEAR OF USE | 3 (= 3 YEARS) |
| PRICE | 10::15 (= ¥100,000 - 150,000) |
| QUALITY | 1 (= ALMOST NEW) |

FIG. 5

60

PD OF BIDDER
(SEARCHING PERSON)

| ITEM | VALUE |
|---|---|
| ARTICLE | 1 (= WATCH) |
| BRAND NAME | 1 (= SEIKO) |
| YEAR OF USE | 1::3 (= 1 TO 3 YEARS) |
| PRICE | 10 (= ¥100,000) |
| QUALITY | 1 (= ALMOST NEW) |

FIG. 8

| NICKNAME | ARTICLE | BRAND | YEAR OF USE | QUALITY |
|---|---|---|---|---|
| YAMAMOTO | WATCH | SEIKO | 3 | ALMOST NEW |
| TAKAHASI | WATCH | SEIKO | 4 | GOOD |
| YAMADA | WATCH | CITIZEN | 5 | BAD |

OK

FIG. 10

230

| ID (231) | END POINT INFORMATION (232) | SEARCH TARGET PERSON PSID LIST (233) | PRESENCE INFORMATION (234) | NICKNAME (235) |
|---|---|---|---|---|
| 1 | | | | |
| 2 | | | | |
| ⋮ | | | | |

FIG. 11

SEARCHING PERSON PD 250

| ITEM | VALUE |
|---|---|
| SEX | 2 (= FEMALE) |
| AGE | 20::25 (20 TO 25 YEARS OLD) |
| NATIVE PLACE | 1 (= TOKYO) |

FIG. 12

SEARCH TARGET PERSON PD 260

| ITEM | VALUE |
|---|---|
| SEX | 1 (= MALE) |
| AGE | 25 (25 YEARS OLD) |
| NATIVE PLACE | 1 (= TOKYO) |

INFORMATION TERMINAL, AND SERVER FOR EFFICIENTLY EXCHANGING MESSAGES VIA A NETWORK

BACKGROUND OF THE INVENTION

The present invention relates to an information terminal capable of exchanging messages via a network, and also to a server and a program for providing a service required by the information terminal for exchange of messages.

With the recent diffusion of the Internet, there is noticed an increase in the number of users who transfer various data to and/or from partners through the Internet. A known system adapted for such transfer of data is, for example, an IM (Instant Messaging) system which transfers text information via the Internet and performs communication in real time with partners.

In the conventional IM system, at the time of connection via the Internet, there are automatically displayed, on the terminal screen in use, the state of connection of a pre-registered partner to the Internet, and any message from the partner, wherein messages are exchanged in real time, or a chat or file is sent (e.g., as described in Cited non-patent reference 1).

Also in the IM system, personal information of each user registered in an IM server is provided for some other user who is in a formed relation of exchange. For example, in case a user A and a user B have formed a relation of exchange, the user B is registered as a buddy of the user A on a buddy list for the user A, while the user A is registered as a buddy of the user B on a buddy list for the user B.

In forming a relation of exchange, one user (e.g., user A) transmits an "invitation" to the other user (e.g., user B), and the user B having received the "invitation" transmits a "consent" in the case of accepting the "invitation" from the user A (i.e., in the case of forming a relation of exchange).

When the user A invites the user B, it is necessary for the user A to know the ID of the user B. And when the user B sends a "consent" to the user A, it is necessary for the user B to know the ID of the user A. For acquiring the ID, both persons negotiate directly with each other to tell the respective ID mutually.

In another known method, the personal information of each user is saved in the IM server, and one user as a searching person searches the ID of the other user who is an interesting target person for the searching user, and the result of such a search is sent as a reply to the terminal of the searching person. More specifically, a search condition is given from the terminal of the searching user to the IM server, so that the IM server can collate the given search condition with the personal information of each user to thereby find out some user who satisfies the given search condition.

[Cited Non-patent Reference 1]

Digital Creators Liaison Conference, Multimedia Internet Dictionary, "Instant Messaging", [online], [Searched Aug. 4, 2003], Internet, <URL: http://www.kaigisho.ne.jp/literacy/midic/data/k2/k2122.htm>

However, in the conventional search system, the information that satisfies the search condition is retrieved, at the time of input of the search condition by the searching user, from the personal information stored in the database of the IM server, and then the retrieved personal information is sent to the searching user. Therefore, even in case the personal information in the database of the IM server is changeable in real time, if the result of the search has once been sent to the searching user, the updated contents of the database are not reflected on the search result given to the searching user. Thus, there arises a problem that, if some user adapted for satisfying the search condition has appeared after execution of the search, the searching user fails to be notified of the fact.

Moreover, since all searches are executed wholly in the IM server, loads are concentrated on the IM server so that, particularly at a time of congestion, there may occur a fall of the reply efficiency as viewed from the searching users.

SUMMARY OF THE INVENTION

The present invention has been accomplished in view of the circumstances mentioned above. And it is an object of the invention to provide improvements in an information terminal, a server and a program, wherein entire loads for processing exchange of messages are dispersed in the server and the information terminals of users, so that concentration of loads on the server alone can be avoided to consequently achieve enhancement in both the reliability (usability) and the reply efficiency of a service.

And another object of the present invention resides in providing an information terminal, a server and a program adapted for executing a search of a message exchange partner always on the basis of the updated latest information.

According to a first aspect of the present invention, there is provided an information terminal. This terminal includes a user information provider for transmitting, via a network to a server which provides a service for searching a message exchange partner, user information inclusive of ID information to indicate a service utilizing purpose of the self user, and enabling the server to register the transmitted user information therein; a user information acquirer for acquiring, from the server via the network, the user information of the other user logged in currently to the service; an ID information setter for setting the ID information indicative of the service utilizing purpose of the self user; a detailed information memory for storing detailed information of a searching condition or a searched condition of the self user; a detailed information memory for storing detailed information of a searching condition or a searched condition of the self user; a searched condition acquirer for collating the ID information in the user information of the other user acquired by the user information acquirer, with the ID information of the self user set by the ID information setter, and acquiring, via the network, the detailed information of the searched condition stored in the detailed information memory of the coincident other user; and a decider for collating the detailed information of the searched condition acquired by the searched condition acquirer, with the detailed information of the searching condition stored in the detailed information memory of the self user, and deciding, as a message exchange partner, the other user who satisfies the predetermined condition of coincidence.

In the present invention, the requirements for the server are merely to transmit and/or receive the user information to and/or from the information terminal of each user and then to manage such user information of each user, wherein collation of the ID information, which is included in the user information and indicates the service utilizing purpose, is executed in the information terminal of the searching user. Further, the information terminal of the searching user acquires the detailed information of the searched condition directly from the information terminal of the other user via the network, and then collates the acquired detailed information of the searched condition with the detailed information of the self user's searching condition. Therefore, the entire loads for processing exchange of messages are dispersed in the server and the information terminals of the users to consequently avoid concentration of the loads on the server alone, hence improving the reliability (usability) of the service and the reply efficiency thereof.

In the information terminal of the present invention, whenever any new user information has been registered in the server by the other user, the user information acquirer may acquire the registered user information of the other user from the server via the network. Whereby the information terminal of the searching user is rendered capable of searching the message exchange partner on the basis of the latest information even after its log in.

Also in the information terminal of the present invention, whenever any user information of the other users registered already in the server has been updated, the user information acquirer may acquire the user information of the other user from the server via the network, whereby the information terminal of the searching user is rendered capable of searching the message exchange partner on the basis of the updated latest information even after its log in.

Further in the information terminal of the present invention, the user information includes connection information necessary for connection to the self user via the network, and the searched condition acquirer is connected to the other user on the basis of the connection information, and acquires the detailed information of the searched condition, which is stored in the detailed information memory of the relevant other user, via the network. That is, the information terminal of the searching user is rendered capable of transferring the detailed information of the searched condition, on the basis of the connection information, by peer-to-peer connection to the information terminal of the target other user.

According to a second aspect of the present invention, there is provided a server for providing, via a network, a service for searching a message exchange partner to each user of the information terminal. This server includes a user information manager for acquiring, from the information terminal of the user logged in to the service, user information inclusive of ID information indicating a service utilizing purpose, and managing the acquired user information; and a user information distributor for distributing the user information of the user managed in the user information manager, to the information terminals of the other users logged in currently.

The requirements for the server of the present invention are merely to transmit and/or receive the user information to and/or from the information terminal of each user and to manage such user information of each user, hence avoiding concentration of the loads on the server alone to consequently improve the reliability (usability) of the service and the reply efficiency thereof.

Also in the server of the present invention, whenever any new user information has been registered in the user information manager, the user information distributor may distribute the registered user information to the information terminals of the other users logged in currently to the service. As a result, the information terminal of the searching user becomes capable of searching the message exchange partner on the basis of the latest information even after its log in.

Further in the server of the present invention, whenever any of the user information managed by the user information manager has been updated, the user information distributor may distribute the updated user information to the information terminals of the other users logged in currently to the service. As a result, the information terminal of the searching user becomes capable of searching the message exchange partner on the basis of the updated information even after its log in.

And according to a third aspect of the present invention, there is provided a program for enabling a computer to function as: a user information provider for transmitting, via a network to a server which provides a service for searching a message exchange partner, user information inclusive of ID information to indicate a service utilizing purpose of the self user, and enabling the server to register the transmitted user information therein; a user information acquirer for acquiring, from the server via the network, the user information of the other user logged in currently to the service; an ID information setter for setting the ID information indicative of the service utilizing purpose of the self user; a detailed information memory for storing detailed information of a searching condition or a searched condition of the self user; a searched condition acquirer for collating the ID information in the user information of the other user acquired by the user information acquirer, with the ID information of the self user set by the ID information setter, and acquiring, via the network, the detailed information of the searched condition stored in the detailed information memory of the coincident other user; and a decider for collating the detailed information of the searched condition acquired by the searched condition acquirer, with the detailed information of the searching condition stored in the detailed information memory of the self user, and deciding, as a message exchange partner, the other user who satisfies the predetermined condition of coincidence.

Therefore, the functional requirements for the server are merely to transmit and/or receive the user information to and/or from the information terminal of each user, and to manage such user information. Meanwhile, collation of the ID information, which is included in the user information and indicates the service utilizing purpose, is executed in the user's information terminal having a computer where the program of the present invention is installed. And in the user's information terminal having a computer with the program of the present invention installed therein, the detailed information of the searched condition is acquired directly from the information terminal of the other user via the network, and the detailed information of the searched condition thus acquired is collated with the detailed information of the self user's searching condition. Thus, the loads necessary for exchange of messages are dispersed in the server and the information terminals of the users to consequently avoid concentration of the loads on the server alone, hence improving the reliability (usability) of the service and the reply efficiency thereof.

As described above, according to the present invention, the entire loads for processing exchange of messages are dispersed in the server and the information terminals of the users, and concentration of the loads on the server alone can be avoided to eventually achieve enhancement in the reliability (usability) of the service and the reply efficiency thereof. Further, it becomes possible for any user to search a message exchange partner on the basis of the latest information even after log in.

The above and other features and advantages of the present invention will become apparent from the following description which will be given with reference to the illustrative accompanying drawings.

BRIEF DESCRIPTION OF THE DRAWINGS

FIG. 4 shows an example of a PD (Profile Description) owned by an exhibitor in the auction;

FIG. 5 shows an example of a PD owned by a bidder in the auction;

FIG. 8 is a diagram showing a display example of a search result;

FIG. 10 is a diagram showing a composition of user information managed on a user management database in FIG. 9;

FIG. 11 shows an example of a searching person PD owned by a user who participates as a searching person in a friend search;

FIG. 12 shows an example of a search target person PD owned by a user who participates as a search target person in a friend search;

DETAILED DESCRIPTION OF THE PREFERRED EMBODIMENTS

Hereinafter some preferred embodiments of the present invention will be described in detail with reference to the accompanying drawings.

Figure 1:
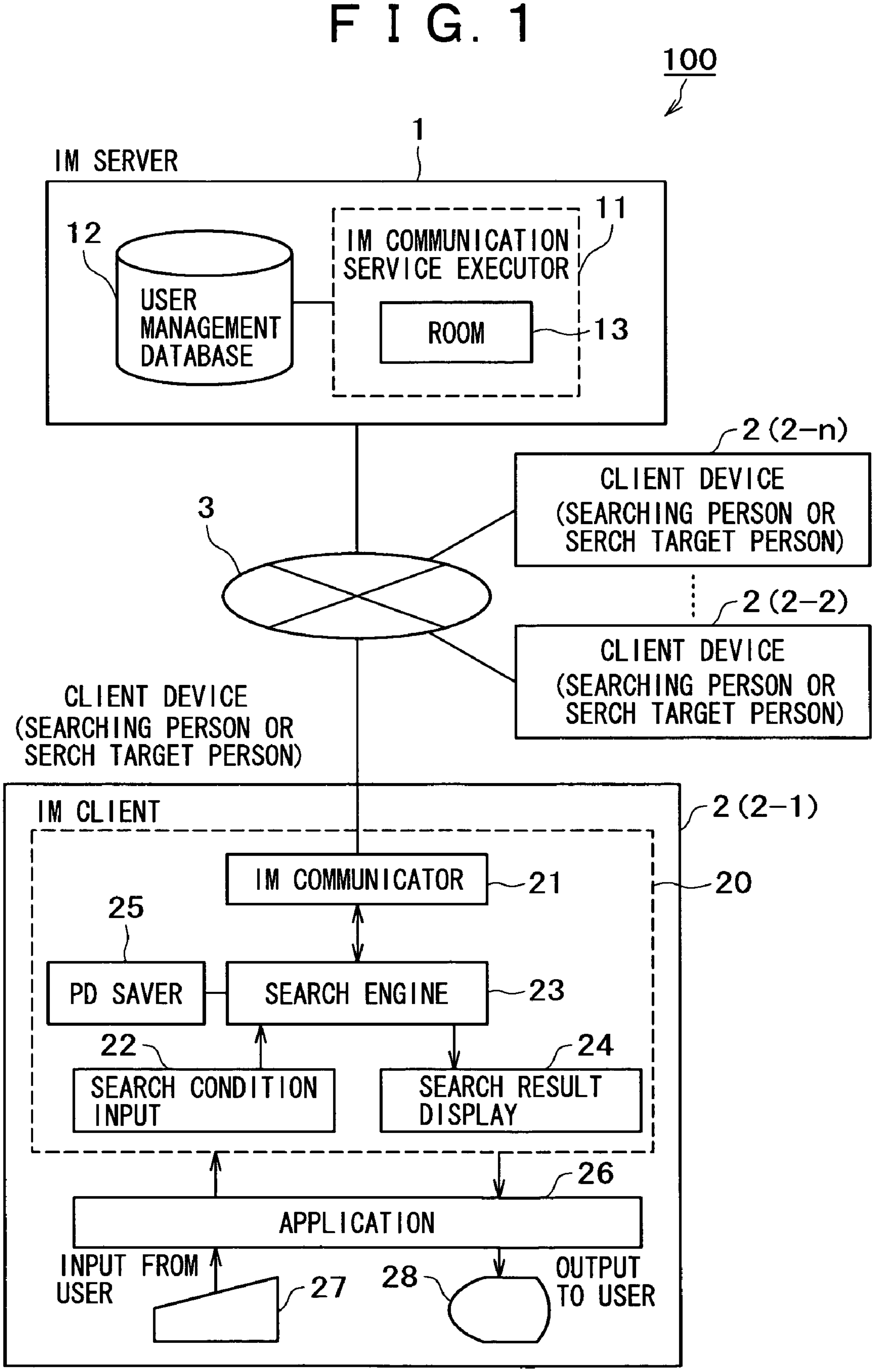
FIG. 1 is an overall block diagram showing the whole structure of an IM communication system according to a first embodiment of the present invention.

FIG. 1 is an overall block diagram showing the whole structure of an IM communication system according to a first embodiment of the present invention.

As shown in this diagram, an IM communication system 100 includes an IM server 1 consisting of a computer to provide an IM communication service; client devices 2 (2-1, 2-2, . . . , 2-n) which are user terminals to receive the IM communication service provided by the IM server 1, each client device consisting of a PC (Personal Computer), a PDA (Personal Digital Assistant), a mobile telephone or the like; and a network 3 such as the Internet via which the IM server 1 and the client devices 2 are mutually connectable.

The IM server 1 is equipped with an IM communication service executor 11 as, e.g., middleware to execute IM communication service. Each client device 2 is equipped with an IM client 20 as, e.g., middleware to receive the IM communication service provided by the IM communication service executor 11 in the IM server 1.

In the IM server 1, the IM communication service executor 11 sets a room 13 as a virtual place where users of plural client devices 2 start to search partners for communication via the network 3. Also the IM communication service executor 11 manages, on a user management database 12, the user information related to users who are capable of utilizing the IM communication service.

Figures 2, 3:
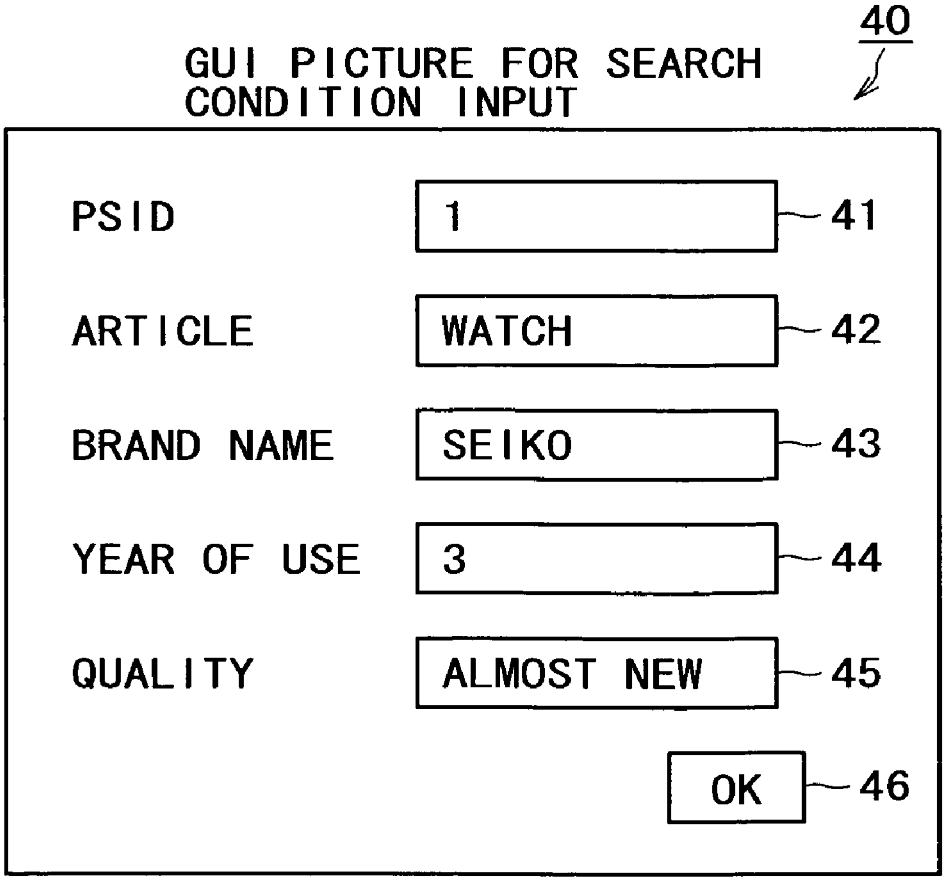
FIG. 2 is a diagram showing a composition of user information managed on a user management database in FIG. 1.
FIG. 3 shows an example of a GUI picture used to input a searching condition in case a search category is an auction.

FIG. 2 is a diagram showing a composition of the user information 30 managed on the user management database 12. As shown in this diagram, the user information 30 is composed of user ID 31, end point information 32, a PSID (Profile Space ID) list 33, presence information 34, nicknames 35 and so forth.

The user ID 31 is an ID given uniquely to an individual user capable of utilizing the IM communication service. The end point information 32 indicates an application operating on the user's client device 2 and becoming a partner for communication. The PSID list 33 is a list of PSID held by the user. PSID (Profile Space ID) signifies a search category such as "auction", "friend search" or the like. In other words, this PSID is identification information indicative of a service utilizing purpose. The presence information 34 signifies the present connection state (online/offline, etc.) of the user. And the nickname 35 is a common name determined optionally by the user himself.

The IM communication service executor 11 has a function of first acquiring the user information 30 from the IM client 20 of the user logged in as a search target person to the room 13, then storing the acquired user information 30 in the user management database 12, and managing the same therein.

Also the IM communication service executor 11 has a function of replying the user information 30 of the search target person managed on the user management database 12, in response to an acquisition request sent from the IM client 20 of the user logged in as a searching person to the room 13.

Further the IM communication service executor 11 has a function of, upon occurrence of every log-in of a new user as a search target person, distributing the user information of the new search target person to the IM clients 20 of the entire searching persons logged in currently to the room 13.

Here, the user of the IM client 20 can selectively decide as to whether he becomes a searching person or a search target person when, for example, logging in to the room 13. And according to the information of this selection, the IM communication service executor 11 in the IM server 1 manages as to whether each of the individual users logged in currently to the room 13 is a searching person or a search target person.

Meanwhile, the IM client 20 of the client device 2 has an IM communicator 21, a search condition input 22, a search engine 23, a search result display 24, and a PD saver 25.

In the PD saver 25, detailed information of the user's searching condition or searched condition is stored as PD (Profile Description). In particular, when the user logs in to the room 13 as a searching person, detailed information of the searching condition needs to be stored as PD for a searching person in the PD saver 25; and when the user logs in to the room 13 as a search target person, detailed information of the searched condition needs to be stored as PD for a search target person in the PD saver 25.

The IM communicator 21 executes a process of IM communication between the IM communication service executor 11 of the IM server 1 and the IM client 20 of the other client device 2. More specifically, the IM communicator 21 receives, from the IM communication service executor 11 of the IM server 1, the user information 30 of the search target person logged in currently to the room 13, and processes the peer-to-peer communication with the IM client 20 of the search target person.

The search condition input 22 gives the searching condition, which has been inputted from the searching person or user via an application 26, to the search engine 23. More specifically, the application 26 displays a GUI (Graphical User Interface) picture for input of the searching condition on the display 28 of the client device 2, then the search condition input 22 reads in the data of the searching condition inputted by the user through manipulation of an input unit 27 on the GUI picture, and gives such data of the searching condition to the search engine 23.

FIG. 3 shows an example of a GUI picture 40 for input of the searching condition in case the search category is "auction". As shown here, the GUI picture 40 for input of the searching condition includes input columns 41-45 for inputting data such as PSID, kind of exhibited article, brand name, year of use, quality and so forth. When the user depresses an OK button 46 after inputting desired data into these columns 41-45 by manipulating the input unit 27, then the data inputted into the columns 41-45 are delivered to the search engine 23 via the search condition input 22.

The search engine 23 has a function of searching the desired subject person, who is one of the search target persons and is coincident with the PSID in the searching condition inputted from the searching person via the search condition input 22, out of the PSID list 33 included in the user information 30 of the search target persons acquired from the IM communication service executor 11 of the server 1 via the IM communicator 21.

Further, in accordance with the user information 30 of the search target person coincident in regard to the PSID, the search engine 23 requests the IM client 20 of the search target person to transmit the PD (Profile Description) via the IM communicator 21, and then collates the received reply PD of the search target person with the self PD (of the searching person) saved in the self PD saver 25.

FIG. 4 shows exemplary contents of a PD 50 owned by an exhibitor (searched person) in an "auction". As shown here, in the PD 50 of the exhibitor, there are described some integral values or ranges thereof which signify the contents determined by each exhibitor with regard to plural data items, such as kind of exhibited article, brand name, year of use, price, quality and so forth.

FIG. 5 shows exemplary contents of a PD 60 owned by a bidder (searching person) in an "auction". As shown here, in the PD 60 of the bidder, there are described some integral values or ranges thereof which signify the contents determined by each bidder with regard to plural data items, such as kind of a desired bid article, brand name, year of use, price, quality and so forth.

The search engine 23 collates the PD 50 of the search target person with the self PD 60 (of the searching person) in respect of each data item, then acquires, as a result of the search, the search target person having the coincident contents of the data items, subsequently requests the IM client 20 of the search target person to register the self (searching person), and receives a reply therefrom.

The search result display 24 displays the search result, which has been obtained from the search engine 23, on a display unit 28.

Further in the client device 2, there is installed an application 26 for internally communicating with the IM client 20 and executing a specific processing routine by the use of the information acquired externally by the IM client 20. This application 26 is one represented by the end point information 32.

Now an explanation will be given on the operation of the IM communication system 100 according to this embodiment.

Figure 6:
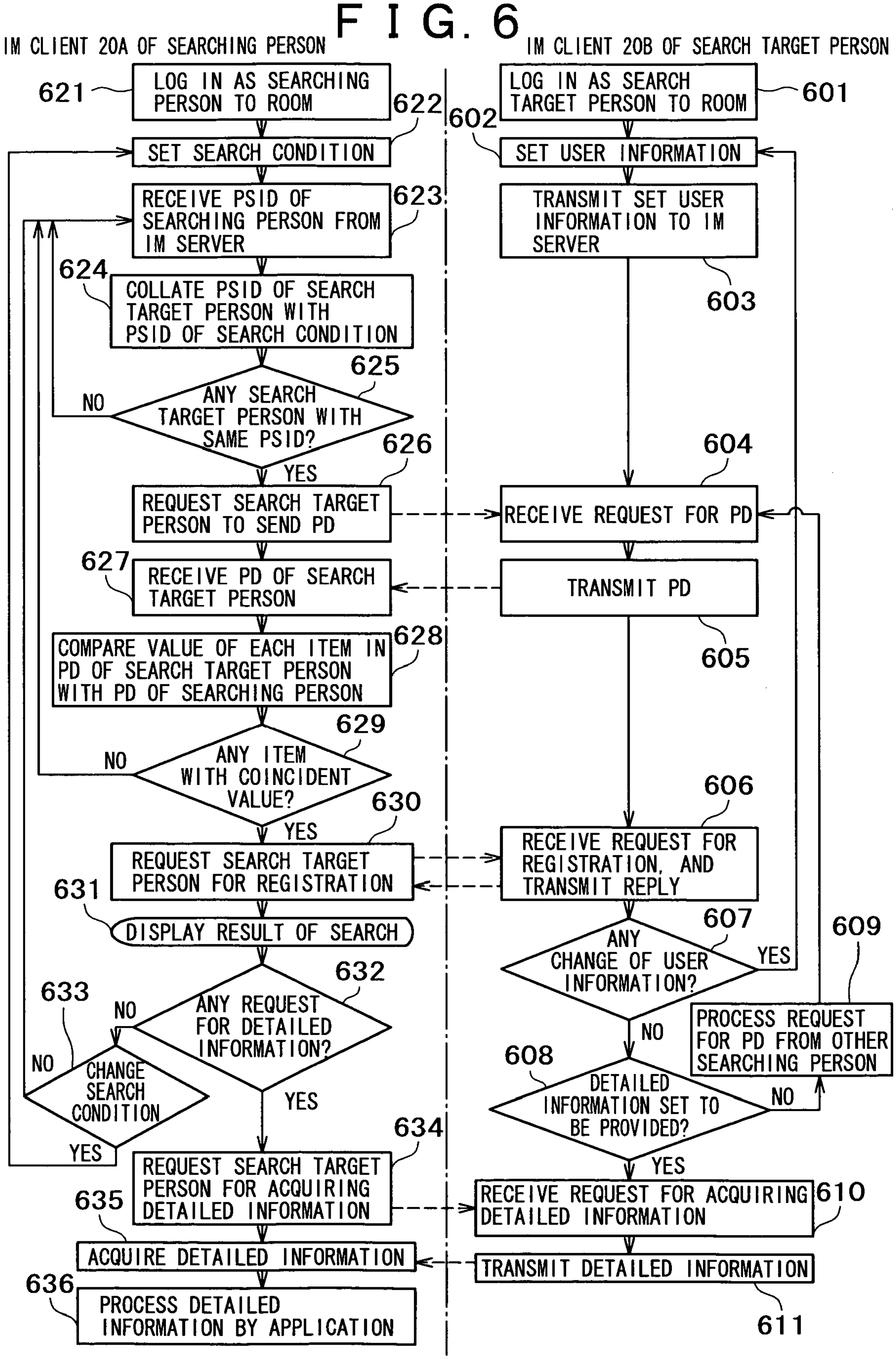
FIG. 6 is a flowchart showing the operation of an IM client in FIG. 1.
Figure 7:
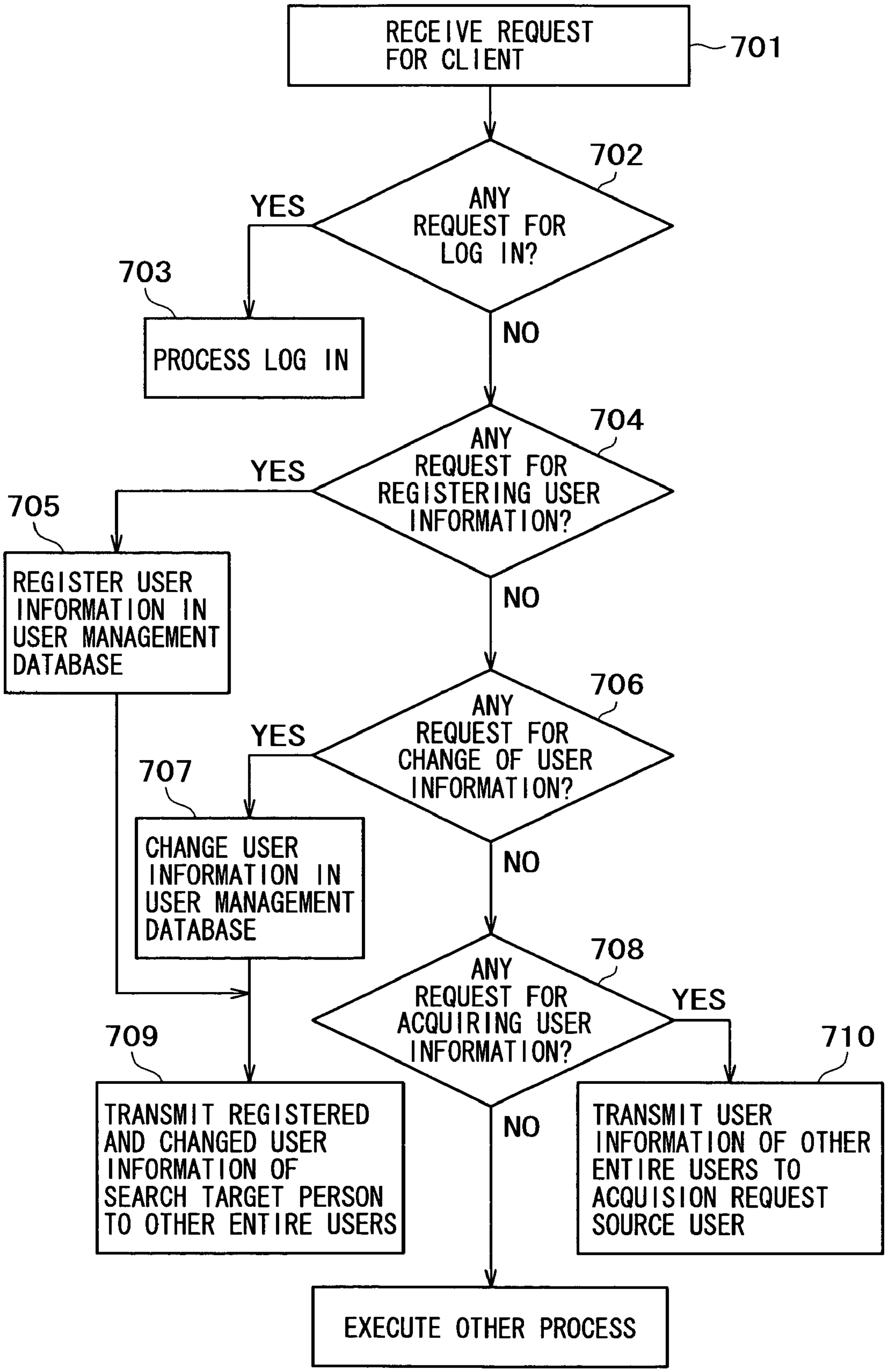
FIG. 7 is a flowchart showing the operation of an IM communication service executor in the IM server in FIG. 1.

FIG. 6 is a flowchart showing the operation of an IM client 20, particularly the operation of an IM client 20A of a searching person and that of an IM client 20B of a search target person. And FIG. 7 is a flowchart showing the operation of the IM communication service executor 11 in the IM server 1.

First a user, who desires to be a search target person, sends a log-in request to the room 13 which is set by the IM communication service executor 11 in the IM server 1 (step 601). Upon reception of such a log-in request from the search target person (step 701, YES at step 702), the IM communication service executor 11 in the IM server 1 executes a log-in process that authenticates the ID and the password included in the received log-in request, and replies the result of the authentication to the IM client 20B (step 703).

The user as a search target person confirms a success in logging in to the room 13 through the picture on the display unit 28 or the like, and then sets end point information 32 and a PSID list 33, which are to be registered as user information 30, in the user management database 12 of the IM server 1 (step 602). After completion of such setting, the IM client 20B transmits, via the IM communicator 21, the set user information to the IM communication service executor 11 of the IM server 1 together with a registration request (step 603).

Upon reception of such a registration request (YES at step 704), the IM communication service executor 11 of the IM server 1 registers both the registration request and the received user information in the user management database 12 (step 705).

Thereafter, regardless of a request from the IM client 20A of the searching person, the IM communication service executor 11 of the IM server 1 transmits the user information of the search target person, which has been registered newly in the user management database 12, to the IM client 20A of the search target person (step 709).

Meanwhile, in case the user desiring to be a searching person has sent a log-in request to the room 13 via the IM client 20A (step 621), the IM communication service executor 11 in the IM server 1 accepts the log-in request from the searching person (YES at step 702), then executes a log-in process that authenticates the ID and the password included in the received log-in request, and replies the result of the authentication to the IM client 20A (step 703).

Upon reception of a notice that signifies a success of logging in to the room 13 from the IM communication service executor 11 of the IM server 1, the IM client 20A of the searching person displays, on the screen of the display unit 28, a GUI picture 40 for inputting a search condition as shown in FIG. 3 for example, thereby urging the user to input the search condition including the PSID. When the searching person has inputted the search condition inclusive of the PSID on the GUI picture 40 and has depressed the OK button 46, the search condition including the PSID and inputted onto the GUI picture 40 is taken in by the search condition input 22 and then is delivered to the search engine 23 (step 622). And after completion of setting the search condition in the search engine 23, the IM communicator 21 sends a request for acquisition of the user information of the search target person to the IM communication service executor 11 of the IM server 1.

Upon reception of the request for acquiring the user information of the search target person (YES at step 708), the IM communication service executor 11 of the IM server 1 transmits the user information of the entire search target persons, who are currently registered in the user management database 12, to the IM client 20A of the request-source searching person (step 710).

After the user information of the search target persons transmitted from the IM communication service executor 11 of the IM server 1 has been received by the IM communicator 21 (step 623), the IM client 20A of the searching person enables the search engine 23 to execute a search, with regard to the received user information 30 of the entire search target persons, to find any search target person whose PSID is coincident with the PSID in the search condition inputted from every user via the search condition input 22 (step 624).

When any search target person with the coincident PSID has been found (YES at step 625), the search engine 23 instructs the IM communicator 21 to acquire the target person PD (e.g., PD 50 in FIG. 4) owned by the relevant search target person. Then, in compliance with this instruction, the IM communicator 21 sends a request to the IM client 20B of the relevant search target person for acquiring the target person PD (step 626).

In case any search target person with the coincident PSID has not been found at step 625 (NO at step 625), the IM client 20A of the searching person enables the IM communicator 21 to send a request again to the IM communication service executor 11 of the IM server 1 for acquiring the user information of the search target person, and after receiving a reply (step 623), the IM client 20A enables the search engine 23 to search any search target person having the coincident PSID of the searching condition (step 624). And the processing routine of steps 623, 624 and 625 is repeated until any search target person with the coincident PSID of the searching condition is found.

In response to the request for acquiring the PD (step 604), the IM client 20B of the search target person reads out the target person PD from the PD saver 25, and transmits the PD via the IM communicator 21 to the IM client 20A of the searching person who is a PD request source (step 605).

Upon reception of the search target person PD (step 627), the IM client 20A of the searching person enables the search engine 23 to collate the contents of the search target person PD with the the contents of the searching person PD (e.g., PD 60 in FIG. 5), which is saved in the self PD saver 25, with regard to every corresponding data item (step 628), and if any search target person having more than one data item of a coincident value has been found (YES at step 629), then the IM client 20A sends a request via the IM communicator 21 to the IM client 20B of the relevant search target person to register the self searching person.

In case the collation result obtained at step 628 signifies that there is no data item with any coincident value (NO at step 629), the IM client 20A of the searching person enables the IM communicator 21 to send a request again to the IM communication service executor 11 of the IM server 1 for acquiring the user information of the search target persons. And thereafter the processing routine of step 623 to step 629 is repeated until data items with coincident values are found in the collation at step 628.

The IM client 20B of the search target person having received the registration request registers the searching person, who is a registration requester, as a communication partner, and then sends back a reply to the IM client 20A of the searching person (step 606).

Subsequently in the IM client 20B of the search target person, a decision is made by the user as to whether there is any change in the user information (step 607). And if the result of this decision signifies no change, the operation proceeds to step 608. In case the result of the decision signifies any change, the operation returns to step 602 where the user information is set. And at step 608, a decision is made by the user whether the detailed information is to be provided or not.

Meanwhile, upon reception of the reply indicative of completion of the registration from the IM client 20B of the search target person, the IM client 20A of the searching person registers the search target person as a search result of a communication partner, and displays the search result on the display unit 28. FIG. 8 shows a display example of some search result. As shown here, the search result is displayed as a list of the user information of the searched target persons. Thereafter, peer-to-peer communication can be performed between the IM client 20A of the searching person and the IM client 20B of the search target person.

In case the search category is "auction", the searching person is permitted thereafter to request the searched target person for acquiring the detailed information of any exhibited article (YES at step 633, step 634). The detailed information includes the image of an exhibited article, description of detailed specifications and so forth, such as HTML (Hyper Text Markup Language) type for example. The detailed information is processed by the application 26 such as Web browser installed in the client device 2, and is displayed on the display unit 28.

In response to the request from the IM client 20A of the searching person for acquisition of the detailed information (step 610), the IM client 20B of the search target person transmits the detailed information to the IM client 20A of the searching person (step 611) in case the decision at step 608 is so set as to provide the detailed information (YES at step 608).

In another case where the decision is so set as not to provide the detailed information (NO at step 608) in the IM client 20B of the search target person, the detailed information is not transmitted to the relevant searching person, and the IM client 20B stands by for a request of PD acquisition from a next searching person (step 609).

The IM client 20A of the searching person having received the detailed information delivers the received detailed information to the application 26 such as Web browser installed in the client device 2 (step 635). The application 26 having thus received the detailed information converts the detailed information into another format readable on the browser screen of the display unit 28, and then provides the converted information to the user (step 636), whereby the user, i.e., the searching person, is notified of the detailed information of the exhibited article.

Instead of a request for acquiring the detailed information from the search target person searched this time (NO at step 632), the searching person is capable of instructing the IM server 1, by means of the input unit 27, to request the IM client 20A for re-acquisition of the user information of the search target person. Consequently, in the IM client 20A of the searching person, the processing routine subsequent to step 623 is repeated. Therefore, if the contents of the user management database 12 in the IM server 1 has been updated after the preceding request for acquisition of the user information, it is possible for the IM client 20A of the searching person to acquire, at step 623, the latest user information of the search target person that represents the reply result reflecting the updated contents, and at step 624, a search for a different search target person is executed by the search engine 23.

Prior to sending an instruction for a request for re-acquisition of the user information of the search target person, the user is capable of recalling, whenever necessary, the searching condition input GUI picture 40, such as that shown in FIG. 3, onto the display unit 28, and re-setting the searching condition inclusive of the PSID on the GUI picture 40 (YES at step 633, step 622). Consequently, at step 624, a search for a target person can be executed under different searching condition by the search engine 23.

When the IM client 20B of the search target person needs to change the self user information registered in the user management database 12 of the IM server 1 (YES at step 607), the IM client 20B changes the internal user information in the client device 2 at step 602, and then transmits a change request, inclusive of the changed user information, to the IM communication service executor 11 of the IM server 1 (step 603).

In response to the request for changing the user information (YES at step 706), the IM communication service executor 11 of the IM server 1 rewrites the corresponding user information in the user management database 12 with the changed user information included in the change request (step 707). Thereafter, the IM communication service executor 11 of the IM server 1 transmits the changed user information to the IM client 20A of the searching person without conforming to a request from the IM client 20A of the searching person (step 709). Then the IM client 20A of the searching person delivers the received user information 30 to the search engine 23, and enables the search engine 23 to execute a search for a target person having the coincident PSID (step 624).

The processing routine of the IM communication service executor 11 of the IM server 1 shown in FIG. 7 is executed in response to every request received from each of the IM clients 20A and 20B, such as a request for log-in, a request for registration of user information, a request for change of user information, a request for acquisition of user information and so forth.

Thus, in the IM communication system 100 of this embodiment, the IM client 20 behaves as either an IM client 20A of a searching person or an IM client 20B of a search target person. The IM client 20B of the search target person registers the user information inclusive of a self PSID list in the user management database 12 of the IM server 1. The IM client 20A of the searching person acquires, from the IM server 1, the user information inclusive of the PSID list of the search target persons registered in the user management database 12, and then searches a target person whose PSID is coincident with the self PSID. And when the search target person has been found, the IM client 20A requests the relevant search target person to transmit its PD, and then collates the received PD with the self PD, thereby specifying the search target person who satisfies the desired condition of the searching person. That is, in the case of "auction" for example, the searching person specifies the search target person whose exhibited article satisfies the desired condition of the bidder.

Therefore, according to the IM communication system 100 of this embodiment, the following advantageous effects are achieved.

The requirements for the IM server 1 are merely to transmit and/or receive the user information to and/or from the client device 2 of each user and to manage such user information 30 of each user, wherein collation of the PSID, which is included in the user information 30 and indicates the service utilizing purpose, is executed by the client device 2 of the user who is a searching person. Meanwhile, the client device 2 of the user who is a search target person directly acquires, from the client device 2 of some other user, the target person PD 50 via the network 3, and collates the acquired target person PD 50 with the searching person PD 60 of the self user. Accordingly, the entire processing loads needed for exchange of messages are dispersed in the IM server 1 and each client device 2 to consequently avoid concentration of the loads on the IM server 1 alone, hence improving the reliability (usability) of the service and the reply efficiency thereof.

Also in the IM communication system of this embodiment, whenever new user information has been registered or changed by any search target person, the newly registered or changed user information is transmitted to the IM client 20A of the searching person, regardless of the presence or absence of any request from the IM client 20A of the searching person, and the processing routine subsequent to the collation of the PSID is executed by the IM client 20A, so that it becomes possible for the IM client 20A of the searching person to search the target person on the basis of the updated latest information even after its log in.

Next, an explanation will be given on another IM communication system representing a second embodiment of the present invention.

In this IM communication system, there is no selection of a searching person or a search target person by a user when an IM client logs in to a room. The IM client of every user having logged in to the room behaves as each IM client of both a searching person and a search target person.

Figure 9:
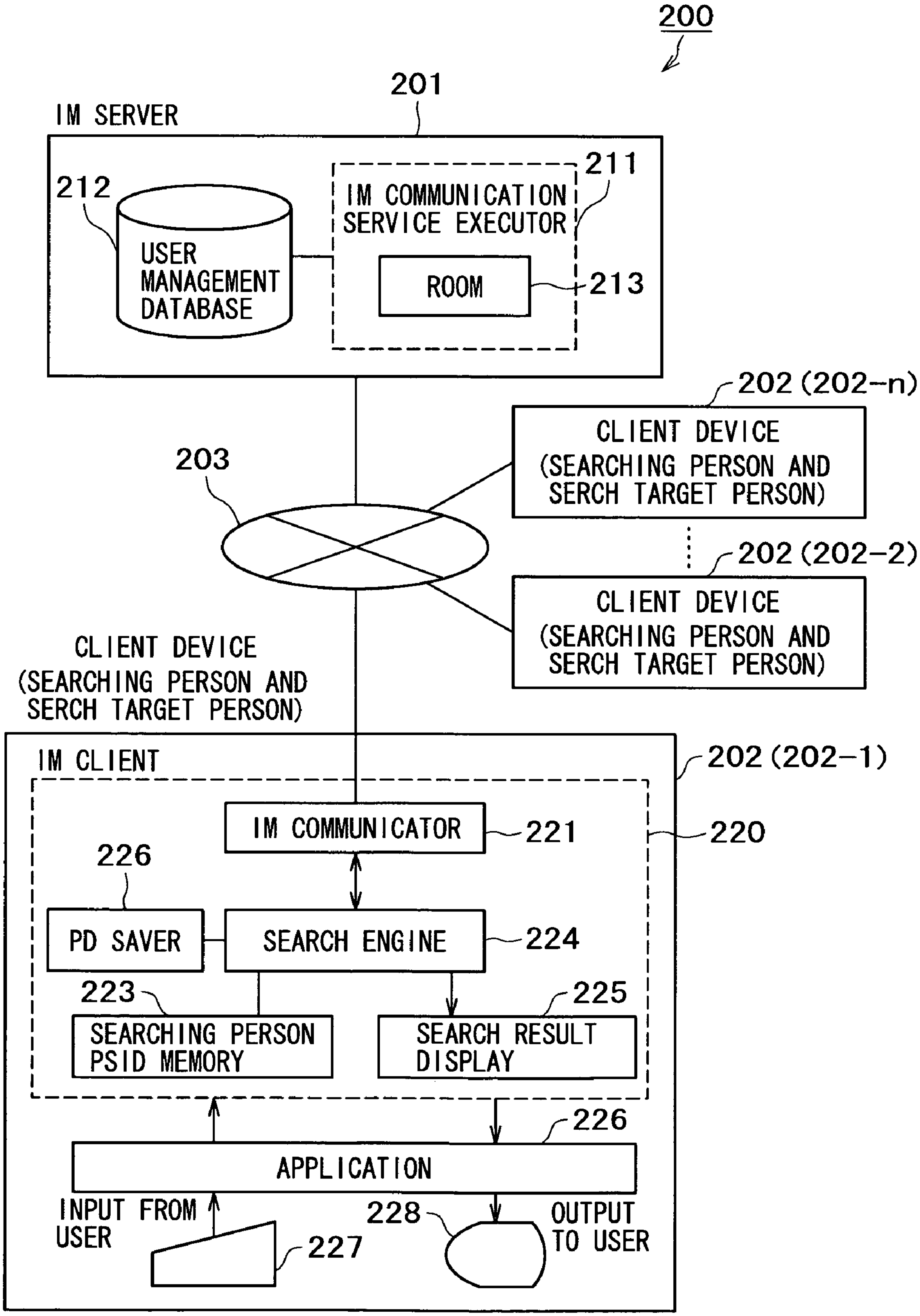
FIG. 9 is an overall block diagram showing the whole structure of an IM communication system according to a second embodiment of the present invention.

FIG. 9 is an overall block diagram showing the whole structure of this IM communication system.

As shown in this diagram, an IM communication system 200 includes an IM server 201 consisting of a computer to provide IM communication service; client devices 202 (202-1, 202-2, . . . , 202-n) which are user terminals to receive the IM communication service provided by the IM server 201, each client device consisting of a PC (Personal Computer), a PDA (Personal Digital Assistant), a mobile telephone or the like; and a network 203 such as the Internet via which the IM server 201 and the client devices 202 are mutually connectable.

The IM server 201 is equipped with an IM communication service executor 211 as, e.g., middleware to execute IM communication service. Each client device 202 is equipped with an IM client 220 as, e.g., middleware to receive the IM communication service provided by the IM communication service executor 211 in the IM server 201.

In the IM server 201, the IM communication service executor 211 sets a room 213 as a virtual place where users of plural client devices 202 start to search opposite persons for communication. Also the IM communication service executor 211 manages, on a user management database 212, the user information related to users who are capable of utilizing the IM communication service.

FIG. 10 is a diagram showing a composition of the user information 230 managed on the user management database 212. As shown in this diagram, the user information 230 is composed of user ID 231, end point information 232, a list 233 of PSID (Profile Space ID) for search target persons, presence information 234, nicknames 235 and so forth.

The user ID 231 is an ID given uniquely to an individual user capable of utilizing the IM communication service. The end point information 232 indicates an application operating on the user's client device 202 and becoming an opposite person for communication. The PSID list 233 for search target persons is a list of PSID held by the user as a search target person. PSID (Profile Space ID) signifies a search category such as "auction", "friend search" or the like. In other words, this PSID is identification information indicative of a service utilizing purpose. The presence information 234 signifies the present connection state (online/offline, etc.) of the user. And the nickname 235 is a common name determined optionally by the user himself.

The IM communication service executor 211 has a function of acquiring the user information 230 from the IM client 220 of the user logged in to the room 213, storing the user information 230 in the user management database 212, and managing the user information 230.

Also the IM communication service executor 211 has a function of transmitting, to the IM client 220 of the user logged in to the room 213, the user information 230 of the other entire users managed on the user management database 212.

Further, the IM communication service executor 211 has a function of transmitting, upon occurrence of every log-in of a new user, such user information 230 to the IM clients 220 of the other entire users logged in currently to the room 213.

Meanwhile, the IM client 220 of the client device 202 has an IM communicator 221, a searching person PSID memory 223, a search engine 224, a search result display 225, and a PD saver 226.

In the PD saver 226, detailed information of the user's searching condition and searched condition is stored as PD (Profile Description) for a searching person and PD for a search target person.

The IM communicator 221 executes a process of IM communication between the IM communication service executor 211 of the IM server 201 and the IM client 220 of the other client device 202. More specifically, the IM communicator 221 receives, from the IM communication service executor 211 of the IM server 201, the user information 230 of the other user logged in currently to the room 213, and processes the peer-to-peer communication with the IM client 220 of the other user.

The searching person PSID memory 223 stores therein a list of PSID for searching persons.

The search engine 224 has a function of collating the search target person PSID list 233 in the user information 230 of the other user acquired from the IM communication service executor 211 of the IM server 201, with the searching person PSID list stored in the searching person PSID memory 223, and searching the search target person who forms a predetermined pair with regard to the PSID of the searching person. More specifically, in case PSID=1 signifies a friend search to a searching person and PSID=2 signifies a friend search to a search target person, if "1" is stored as PSID in the searching person PSID memory 223 and "2" is included as PSID in the searching person PSID list 233 in the user information 230 of the search target person, then the relevant search target person is obtained as a result of the search.

Further, in accordance with the user information 230 of the searched target person, the search engine 224 requests the IM client 220 of the relevant search target person to transmit the PD (Profile Description) thereof via the IM communicator 221, and then collates the received reply PD of the search target person with the PD of the searching person saved in the self PD saver 226.

FIG. 11 shows exemplary contents of a searching person PD 250 owned by a user who participates as a searching person in "friend search". As shown here, in the searching person PD 250, there are described some integral values or ranges thereof which signify the contents determined by each searching person with regard to plural data items, such as sex, age or its range, native place and so forth of the search target person.

FIG. 12 shows exemplary contents of a search target person PD 260 owned by a user who participates as a search target person in "friend search". As shown here, in the search target person PD 260, there are described some integral values which signify the respective contents of plural data items, such as sex, age, native place and so forth of the search target person.

The search engine 224 collates the PD 250 of the searching person with the self PD 260 of the search target person in respect of each data item, then acquires, as a result of the search, the search target person having the coincident contents of the data items, subsequently requests the IM client 220 of the relevant search target person to register the self (searching person), and receives a reply therefrom.

The search result display 225 displays the search result, which has been obtained from the search engine 224, on a display unit 228.

Further in the client device 202, there is installed an application 227 for internally communicating with the IM client 220 and executing a specific processing routine by the use of the information acquired externally by the IM client 220. This application 227 is one represented by the end point information 232.

Next, an explanation will be given on the operation of this IM communication system.

Figure 13:
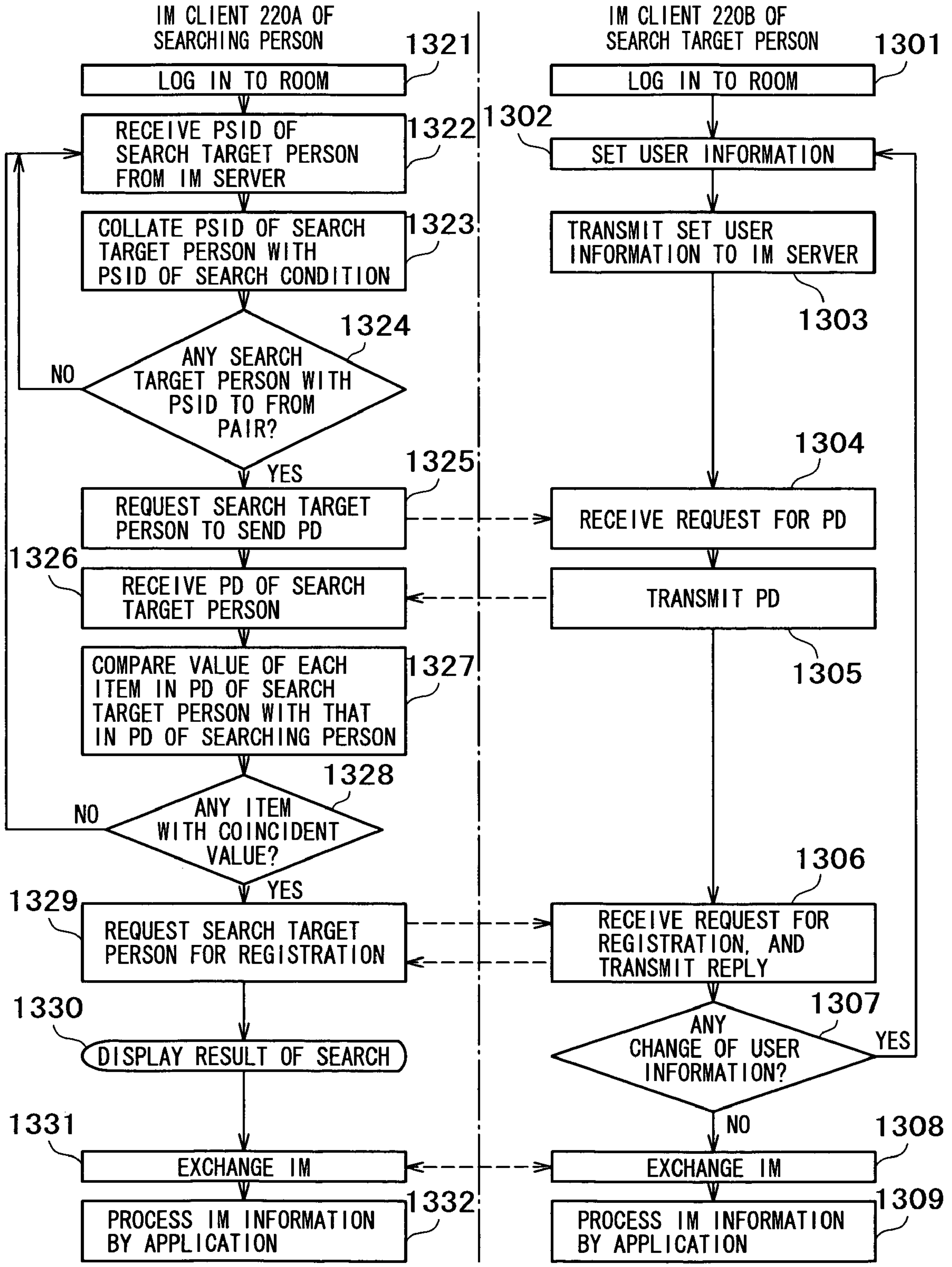
FIG. 13 is a flowchart showing the operation of an IM client in FIG. 9.
Figure 14:
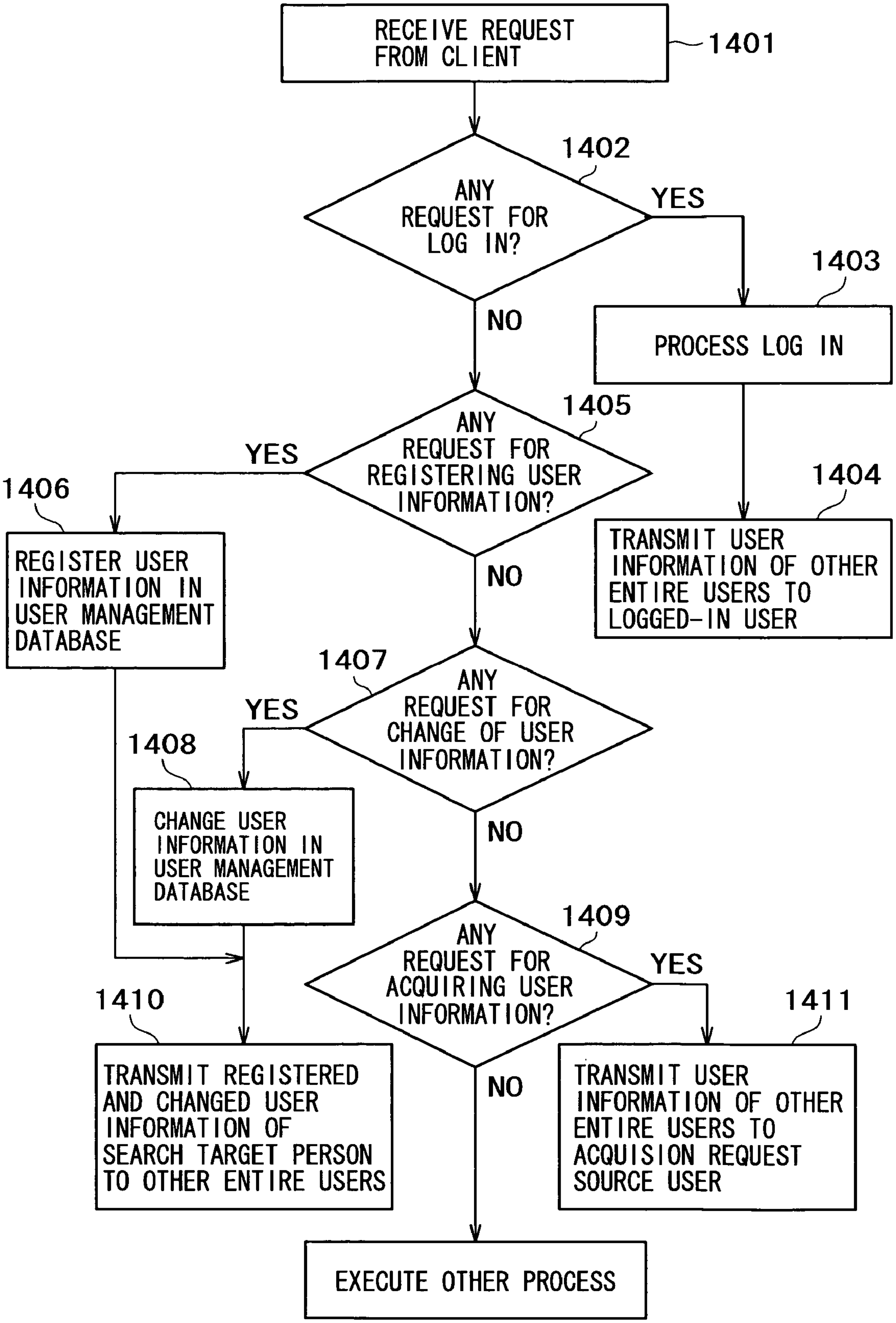
FIG. 14 is a flowchart showing the operation of an IM communication service executor in the IM server in FIG. 9.

FIG. 13 is a flowchart showing the operation of an IM client 220, particularly the operation of an IM client 220A of a searching person and that of an IM client 220B of a search target person. The IM client 220 of every user logged in to the room 213 behaves as both the IM client 220A of the searching person and the IM client 220B of the search target person. FIG. 14 is a flowchart showing the operation of the IM communication service executor 211 in the IM server 201.

First, a user sends a log-in request via the IM client 220A or 220B to the room 213 set by the IM communication service executor 211 in the IM server 201 (steps 1301, 1321). Upon reception of such a log-in request from the user (step 1401, YES at step 1402), the IM communication service executor 211 in the IM server 201 executes a log-in process that authenticates the ID and the password included in the received log-in request, and replies the result of the authentication to the IM client 220A or 220B (step 1403).

After succeeding in the authentication, the IM communication service executor 211 in the IM server 201 transmits the user information 230 of the other entire users managed on the user management database 212 to the IM client 220A or 220B of the user logged in to the room 213 (step 1404).

The user as a search target person confirms a success in logging in to the room 213 through the picture on the display unit 228 or the like, and then sets end point information 232, a search target person PSID list 233, a nickname 235 and so forth, which are to be registered as user information 230, in the user management database 212 of the IM server 201 (step 1302). After completion of such setting, the IM client 220B transmits, via the IM communicator 221, the set user information to the IM communication service executor 211 of the IM server 201 together with a registration request (step 1303).

Upon reception of such a registration request (YES at step 1405), the IM communication service executor 211 of the IM server 201 registers both the registration request and the received user information in the user management database 212 (step 1406).

Thereafter, the IM communication service executor 211 of the IM server 201 transmits the user information of the search target person, which has been registered newly in the user management database 212, to the IM clients 220 of the other entire users logged in currently to the room 213 (step 1410).

The IM client 220A of the searching person acquires the user information of the search target person transmitted from the IM server 201 (step 1322), and delivers the acquired user information to the search engine 224.

The search engine 224 collates the search target person PSID list 233, which is included in the acquired user information 230 of the other users, with the searching person PSID list stored in the searching person PSID memory 223 (step 1323), and searches the target person who forms a predetermined pair with the searching person PSID (step 1324).

Subsequently, the search engine 224 instructs the IM communicator 221 to acquire the search target person PD (e.g., PD 260 in FIG. 12) owned by the searched target person. And in response to this instruction, the IM communicator 221 sends a request to the IM client 220B of the relevant search target person for acquiring the search target person PD (step 1325).

In case the result at step 1324 signifies that any search target person to form a predetermined pair with the searching person PSID has not been found (NO at step 1324), the IM client 220A of the searching person enables the IM communicator 221 to send a request to the IM communication service executor 211 of the IM server 201 for acquiring the user information of the search target person. And upon reception of such a request for acquiring the user information of the search target person (YES at step 1409), the IM communication service executor 211 of the IM server 201 transmits the user information of the other entire search target persons, who are currently registered in the user management database 212, to the IM client 220A of the request-source searching person (step 1411).

After acquiring the user information of the search target persons from the IM communication service executor 211 of the IM server 201 (step 1322), the IM client 220A of the searching person enables the search engine 223 to collate again the search target person PSID list 233, which is included in the acquired user information 230 of the other entire users, with the searching person PSID list stored in the searching person PSID memory 223 (step 1323). And the processing routine of steps 1322, 1323 and 1324 is repeated until finding a search target person who forms a predetermined pair with the searching person PSID.

In response to the request for acquiring the PD (step 1304), the IM client 220B of the search target person reads out the target person PD from the PD saver 226, and transmits the PD via the IM communicator 221 to the IM client 220A of the searching person who is a PD request source (step 1305).

Upon reception of the search target person PD (step 1326), the IM client 220A of the searching person enables the search engine 224 to collate the contents of the search target person PD with the the contents of the searching person PD (e.g., PD 250 in FIG. 11), which is saved in the self PD saver 226, with regard to every corresponding data item (step 1327), and if any search target person having more than one data item of a coincident value has been found (YES at step 1328), then the IM client 220A sends a request via the IM communicator 221 to the IM client 220B of the relevant search target person to register the self searching person.

In case any search target person satisfying the predetermined coincident condition has not been found (NO at step 1328), the IM client 220A of the searching person enables the IM communicator 221 to send a request again to the IM communication service executor 211 of the IM server 201 for acquiring the user information of the search target persons. And thereafter the processing routine of step 1322 to step 1328 is repeated until a desired search target person satisfying the predetermined coincident condition is found in the collation at step 1328.

The IM client 220B of the search target person having received the registration request from the IM client 220A of the searching person registers the relevant searching person, who is a registration requester, as a communication partner, and then sends back a reply to the IM client 220A of the searching person (step 1306).

Subsequently in the IM client 220B of the search target person, a decision is made by the user as to whether there is any change in the user information (step 1307). And if the result of this decision signifies no change, the operation proceeds to step 1308. In case the result of the decision signifies any change, the operation returns to step 1302 where the user information is set.

Meanwhile, upon reception of the reply indicative of completion of the registration from the IM client 220B of the search target person, the IM client 220A of the searching person registers the search target person as a search result of a communication partner, and displays the search result on the display unit 228 (step 1330).

Thereafter, the IM client 220A of the searching person and the IM client 220B of the search target person can perform peer-to-peer communication.

In case the search category is "friend search", subsequent exchange of IM between the searching person and the search target person can be performed by both applications 227 thereof (steps 1331, 1332, 1308 and 1309).

When the IM client 220B of the search target person needs to change the self user information registered in the user management database 212 of the IM server 201 (YES at step 1307), the IM client 220B changes the internal user information in the client device 202 at step 1302, and then transmits a change request, inclusive of the changed user information, to the IM communication service executor 211 of the IM server 201 (step 1303).

In response to the request for changing the user information (YES at step 1407), the IM communication service executor 211 of the IM server 201 rewrites the corresponding user information in the user management database 212 with the changed user information included in the change request (step 1408). Thereafter, the IM communication service executor 211 of the IM server 201 transmits the changed user information to the IM clients 220 of the other entire users logged in currently to the room 213 (step 1410). Then the IM client 220A of the searching person delivers the received user information 230 to the search engine 224, and enables the search engine 224 to execute a search for a target person (step 1323).

The processing routine of the IM communication service executor 211 of the IM server 201 shown in FIG. 14 is executed in response to every request received from each of the IM clients 220A and 220B, such as a request for log-in, a request for registration of user information, a request for change of user information, a request for acquisition of user information and so forth.

Thus, in this IM communication system 200, the IM client 220 behaves as both the IM client 220A of the searching person and the IM client 220B of the search target person. When any user logs in to the room 213, the user information 230 of the other entire users managed on the user management database 212 is transmitted to the IM client 220 of the user logged in. The IM client 220A of the searching person acquires the user information of the search target person transmitted from the IM server 201, then enables the search engine 224 to collate the search target person PSID list 233, which is included in the acquired user information 230 of the other users, with the searching person PSID list stored in the searching person PSID memory 223, and searches any target person who forms a predetermined pair with the searching person PSID. Subsequently, the search engine 224 acquires the search target person PD owned by the searched target person, and collates the acquired search target person PD with the searching person PD saved in the self PD saver 226, thereby specifying the search target person who satisfies the desired condition of the searching person. That is, in the case of "friend search" for example, the search target person satisfying the condition of sex, age and so forth desired by the searching person is specified as a friend, i.e., as an IM communication partner.

Therefore, according to this IM communication system 200, the following advantageous effects are achieved.

The information transmitted and received between the IM server 201 and each client 202 is merely the user information 230 of each user. The search target person PD 260, which is the information necessary for specifying the search target person who satisfies the desired condition of the searching person, is transferred directly between the IM client 220A of the searching person and the IM client 220B of the search target person, and the collation of the search target person PD 260 with the searching person PD 250 is performed in the IM client 220A. Therefore, it becomes possible to avoid concentration of the loads on the IM server 201 alone, hence improving the reliability (usability) of the service and the reply efficiency thereof.

Also in the IM communication system of this embodiment, whenever new user information has been registered or changed in the IM server 201, the newly registered or changed user information is transmitted to the IM clients 220 of the other entire users, and the processing routine subsequent to the collation of the PSID is executed by each of the IM clients 220, so that the IM client 220A of the searching person is rendered capable of searing the target person on the basis of the updated latest information even after its log in.

It is to be understood that the present invention is not limited to the embodiments mentioned hereinabove, and it is a matter of course that a variety of other changes and modifications may be added within the scope not departing from the spirit of the present invention.

What is claimed is:

1. An information terminal connected to a server that provides a service for searching a message exchange partner to each user of the information terminal via a network, the server including a login manager configured to log in a new user into said service in accordance with log in information indicating the user as one of a searching user and a search target user, a user information manager configured to acciuire, from the information terminal of a user logged in to said service as a search target user, user information inclusive of an ID information, and manage the acciuired user information; and a user information distributor configured to distribute the user information of the search target user to the information terminal of at least one logged in searching user in response to acciuisition of the user information by the user information manager, said information terminal comprising:

a user information provider configured to transmit, via said network to said server, a user information including an ID information of a user for logging on to and registering in said server, said ID information indicating a search category;

a user information acquirer configured to acquire, from said server via said network, user information of at least one other user logged in to the service;

an ID information setter configured to set the ID information indicative of the search category;

a detailed information memory configured to store detailed information of one of a searching condition and a searched condition of the user;

a searched condition acquirer configured to collate, independently of the server, ID information in the user information of the at least one other user acquired by said user information acquirer, with the ID information of the user set by said ID information setter, and acquire, via said network, detailed information of a searched condition stored in said detailed information memory of a coincident other user; and a decider configured to collate the detailed information of the searched condition acquired by said searched condition acquirer, with the detailed information of the searching condition stored in said detailed information memory of the user, and decide, independently of the server, the other user who satisfies a predetermined condition of coincidence as a message exchange partner.

2. The information terminal according to claim 1, wherein said user information acquirer acquires the user information of the other user from said server via said network whenever the user information is registered in said server by said other user.

3. The information terminal according to claim 1, wherein said user information acquirer acquires the user information of the other user from said server via said network whenever the user information of said other user registered in said server is updated.

4. The information terminal according to claim 1, wherein said user information includes connection information necessary for connection to the user via said network, and said searched condition acquirer is connected to the other user on the basis of the connection information, and acquires the detailed information of the searched condition, which is stored in said detailed information memory of the relevant other user, via said network.

5. A server for providing, via a network, a service for searching a message exchange partner to each user of an information terminal, the information terminal including a user information provider configured to transmit, via said network to said server, a user information including an ID information of a user for logging on to and registering in said server, said ID information indicating a search category; a user information acquirer configured to acquire, from said server via said network, user information of at least one other user logged in to the service; an ID information setter configured to set the ID information indicative of the search category; a detailed information memory configured to store detailed information of one of a searching condition and a searched condition of the user; a searched condition acquirer configured to collate, independently of the server, ID information in the user information of the at least one other user acquired by said user information acquirer, with the ID information of the user set by said ID information setter, and acquire, via said network, detailed information of a searched condition stored in said detailed information memory of a coincident other user; and a decider configured to collate the detailed information of the searched condition acquired by said searched condition acquirer, with the detailed information of the searching condition stored in said detailed information memory of the user, and decide, independently of the server, the other user who satisfies a predetermined condition of coincidence as a message exchange partner, said server comprising:

a login manager configured to log in a new user into said service in accordance with log in information indicating the user as one of a searching user and a search target user;

a user information manager configured to acquire, from the information terminal of a user logged in to said service as a search target user, user information inclusive of the ID information, and manage the acquired user information; and a user information distributor configured to distribute the user information of the search target user to the information terminal of at least one logged in searching user in response to acquisition of the user information by the user information manager.

6. The server according to claim 5, wherein said user information distributor distributes registered user information to the information terminal of the at least one logged in searching user in response to registration of the user information in the user information manager.

7. The server according to claim 5, wherein said user information distributor distributes updated user information to the information terminal of the at least one logged in searching user in response to updates received by the user information manger corresponding to the user information.

8. A computer-readable storage medium having computer readable instructions thereon, said instructions when executed by a server that provides a service for searching a message exchange partner to each user of an information terminal, cause the server to perform the steps comprising:

logging in a new user into said server in accordance with log in information indicating the user as one of a searching user and a search target user;

acquiring, from the information terminal of a user logged in to said service as a search target user, user information inclusive of an ID information, and managing the acquired user information; and distributing the user information of the search target user, to the information terminal of at least one logged in searching user in response to acquisition of the user information by the user information manager; and the information terminal:

transmitting, via a network to the server, user information inclusive of the ID information, and enabling said server to register the transmitted user information therein;

acquiring, from said server via said network, the user information of at least one other user logged in currently to the service;

setting the ID information indicative of the search category;

storing detailed information of one of a searching condition and a searched condition of the user;

collating, independently of the server, ID information in the user information of the other user acquired by said user information acquirer, with the ID information of the user set by said ID information setter;

acquiring, via said network, the detailed information of the searched condition stored in said detailed information memory of the coincident other user;

collating the detailed information of the searched condition acquired by said searched condition acquirer, with the detailed information of the searching condition stored in said detailed information memory of the user; and deciding, independently from said server, the other user who satisfies the predetermined condition of coincidence as a message exchange partner.

9. A system having an information terminal and a server that provides a service for searching a message exchange partner to each user of the information terminal vai a network:

Said server including:

a login manager configured to log in a new user into said service in accordance with log in information indicating the user as one of a searching user and a search target user;

a user information manager configured to acquire, from the information terminal of a user logged in to said service as a search target user, user information inclusive of the ID information, and manage the acquired user information;

a user information distributor configured to distribute the user information of the search target user to the information terminal of at least one logged in searching user in response to acquisition of the user information by the user information manager; and said information terminal including:

a user information provider configured to transmit, via said network to said server, a user information including the ID information of a user for logging on to and registering in said server, said ID information indicating a search category;

a user information acquirer configured to acquire, from said server via said network, user information of at least one other user logged in to the service;

an ID information setter configured to set the ID information indicative of the search category;

a detailed information memory configured to store detailed information of one of a searching condition and a searched condition of the user;

a searched condition acquirer configured to collate, independently of the server, ID information in the user information of the at least one other user acquired by said user information acquirer, with the ID information of the user set by said ID information setter, and acquire, via said network, detailed information of a searched condition stored in said detailed information memory of a coincident other user; and a decider configured to collate the detailed information of the searched condition acquired by said searched condition acquirer, with the detailed information of the searching condition stored in said detailed information memory of the user, and decide, independently of the server, the other user who satisfies a predetermined condition of coincidence as a message exchange partner.

* * * * *